United States Patent
Gervais et al.

(10) Patent No.: US 9,976,881 B2
(45) Date of Patent: May 22, 2018

(54) SYSTEM AND METHOD FOR ANALYZING PRODUCT FLOW SIGNAL FOR AN AGRICULTURAL IMPLEMENT

(71) Applicant: CNH Industrial Canada Ltd., Saskatoon, Saskatchewan (CA)

(72) Inventors: Joel Gervais, Saskatchewan (CA); Scott Noble, Saskatchewan (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 349 days.

(21) Appl. No.: 14/560,747

(22) Filed: Dec. 4, 2014

(65) Prior Publication Data
US 2016/0161306 A1   Jun. 9, 2016

(51) Int. Cl.
G01F 1/06 (2006.01)
G01F 25/00 (2006.01)
G01F 22/00 (2006.01)
G06T 7/62 (2017.01)

(52) U.S. Cl.
CPC .............. *G01F 1/06* (2013.01); *G01F 22/00* (2013.01); *G01F 25/0092* (2013.01); *G06T 7/62* (2017.01); *G06T 2207/10016* (2013.01)

(58) Field of Classification Search
CPC ...................................................... G01F 1/06
See application file for complete search history.

(56) References Cited

U.S. PATENT DOCUMENTS

| 4,635,215 A | 1/1987 | Friend |
| 7,478,603 B2 | 1/2009 | Riewerts et al. |
| 8,176,797 B2 | 5/2012 | Henry et al. |

(Continued)

FOREIGN PATENT DOCUMENTS

| EP | 1662247 | 5/2006 |
| EP | 1882405 | 1/2008 |
| WO | 2005096799 | 10/2005 |

OTHER PUBLICATIONS

Alchanatis et al., "A Machine Vision System for Evaluation of Planter Seed Spatial Distribution", Agricultural Engineering International: the CIGR Journal of Scientific Research and Development, Manuscript IT 01 005. vol. IV. Apr. 2002, 10 pages.

(Continued)

*Primary Examiner* — Clayton E Laballe
*Assistant Examiner* — Dennis Hancock
(74) *Attorney, Agent, or Firm* — Rebecca L. Henkel; Rickard K. DeMille (57) ABSTRACT

A system and method are provided for quantifying a degree of discontinuity of material flow from a meter roller. A flowable particulate material is fed into a meter roller rotated at a constant speed while a camera takes pictures or images of the product dispensed from the roller. The images of the product taken by the camera are analyzed to determine the area of the image represented by the product. The areas of product within the images are then compared with one another to determine how continuous the area of product is in the respective frames. The area measurement for each image is calculated at a frame rate for the camera that, when compared to the flute frequency range of the roller, provides a frame per flute ratio that ensures all particles of product dispensed from the roller are captured in an image without overlap of product between frames.

12 Claims, 4 Drawing Sheets

(56) References Cited

U.S. PATENT DOCUMENTS

| | | |
|---|---|---|
| 8,365,679 B2 | 2/2013 | Landphair |
| 2011/0056308 A1* | 3/2011 | Henry ................. G01F 1/06 |
| | | 73/861.73 |
| 2012/0031315 A1 | 2/2012 | Beaujot |
| 2012/0309636 A1* | 12/2012 | Gibbons ........... B01L 3/0275 |
| | | 506/9 |
| 2013/0177455 A1* | 7/2013 | Kamen ............ G06F 19/3418 |
| | | 417/313 |

OTHER PUBLICATIONS

"Reduce Skips and Doubles", Precision Printing, www.precisionplanting.com/Products/Precision-Meter/Precision-Finger-Set.aspx, Oct. 19, 2013, 2 pages.

Gervais et al., "The Development of A Standard Test Method for Measuring the Evenness of Flow Off Meter Rollers", XVIIth World Congress of the International Commission of Agricultural and Biosystems Engineering (CIGR), Quebec City, Canada, Jun. 13-17, 2010, 10 pages.

Karayel et al., "Laboratory Measurement of Seed Drill Seed Spacing and Velocity of Fall of Seeds Using High-Speed Camera System", Computers and Electronics in Agriculture 50 (2006), 89-96.

Test Method for Precision Seed Singulation Systems; http://elibrary.asabe.org/abstract.asp?aid=45103&t=2&redir=&redirType=; ASABE journal; Y. Wan et al.; 2014.

* cited by examiner

SYSTEM AND METHOD FOR ANALYZING PRODUCT FLOW SIGNAL FOR AN AGRICULTURAL IMPLEMENT

FIELD OF THE DISCLOSURE

The invention relates generally to a system and method for measuring material flow rate from a meter roller, and more specifically, to quantifying meter roller flow rate discontinuities as a way to evaluate the performance of a meter roller over a range of operating characteristics and/or products dispensed by the meter roller.

BACKGROUND OF THE DISCLOSURE

A range of agricultural implements have been developed and are presently in use for tilling, planting, harvesting, and so forth. Seeders, for example, are commonly towed behind tractors and may cover wide swaths of ground which may be tilled or untilled. Such devices typically open the soil, dispense seeds in the soil opening, and re-close the soil in a single operation. In seeders, seeds are commonly dispensed from bulk seed tanks and distributed to row units by a distribution system. In certain configurations, air carts are towed behind the seeders to deliver a desired flow of seeds to the row units.

Air carts generally include a seed storage tank, an air source (e.g., a blower) and a metering assembly. The seeds are typically gravity fed from the storage tank to the metering assembly that distributes a desired volume of seeds into an air flow generated by the air source. The air flow then carries the seeds to the row units via conduits extending between the air cart and the seeders. The metering assembly typically includes meter rollers or other metering devices that regulate the flow of seeds based on meter roller geometry and rotation rate. However, because typical meter rollers employ a series of flutes and recesses to control the flow of seeds, the flow is generally discontinuous with respect to space and time. The degree of discontinuity generally increases for low meter roller rotation speeds, such as those typically employed for smaller grains (e.g., canola, mustard, etc.).

Delivering seeds to the row units at a desired and continuous rate ensures proper seed distribution within the soil. Unfortunately, the discontinuity in seed flow rate from the meter rollers increases the difficulty associated with flow rate measurement and adjustment.

One system that has been developed to measure flow rate discontinuity is disclosed in U.S. Pat. No. 8,176,797, the entirety of which is hereby expressly incorporated by reference. In this method, a meter roller is rotated in discrete increments and the mass of the seeds or other material dispensed by the roller is measured. This measurement is then compared to the mass of product dispensed by the roller after a complete revolution of the roller and utilized to determine at statistical parameter indicative of the flow rate discontinuity for the roller.

While this prior art method can determine one measure for the continuity of the metering roller, this test method requires a significant amount of time to perform, and does not ideally represent how a meter roller would perform during field operation due to the slow and intermittent operation of the roller, as opposed to the continuous operation of the roller as employed in the field.

Consequently, it is desirable to develop an improved system and method for measuring flow rate discontinuity from current meter roller designs and quantifying the degree of discontinuity. Such a configuration may facilitate development of future meter rollers that provide enhanced flow characteristics.

SUMMARY OF THE DISCLOSURE

According to one exemplary embodiment of the present invention, the present invention provides a system and method for quantifying the degree of discontinuity of material flow from a meter roller. In an exemplary embodiment, flowable particulate material (e.g., seeds, fertilizer, etc.) is fed into a meter roller. The meter roller is then rotated at a constant speed while a camera takes pictures or images of the product dispensed from the roller. The speed of the roller is continuous and is selected to be a speed that is utilized in the actual operation of the roller in the field. Next, the images of the product taken by the camera are analyzed to determine the area of the image represented by the product. The areas of product within the images are then compared with one another to determine how continuous the area of product is in the respective frames. The area measurement for each frame or image is calculated at a frame or image rate for the camera that, when compared to the flute frequency range of the roller, provides a frame per flute ratio that ensures all particles of the product dispensed from the roller are captured in an image without too much overlap of product between frames. The analysis utilized in the method can also determine a statistical parameter indicative of flow rate discontinuity (e.g., standard deviation) that is applied to the area data for each image. This method facilitates evaluation and comparison of various meter roller designs, and may provide valuable data for enhancing meter roller particle flow properties.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

The drawings illustrate the best mode of practicing the present disclosure and preferred exemplary embodiments of the invention are illustrated in the accompanying drawings in which like reference numerals represent like parts throughout.

In the drawings.

DETAILED DESCRIPTION OF THE DISCLOSURE

Figure 1:
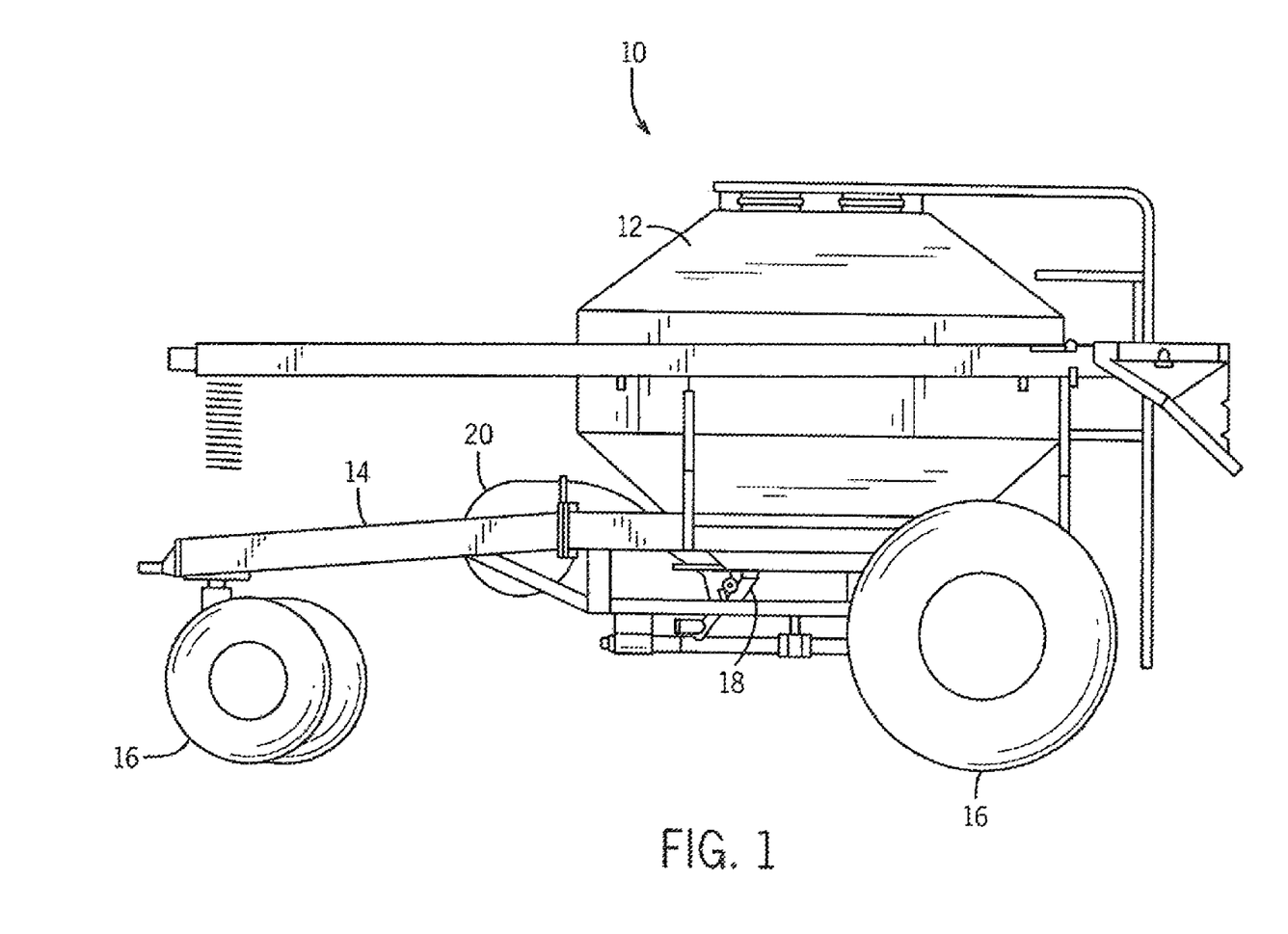
FIG. 1 is a side view of an air cart, including a metering assembly configured to regulate a flow of particulate material.

Turning now to the drawings, FIG. 1 is a side view of an air cart 10 that may be used in conjunction with a towable agricultural implement to deposit seeds into the soil. For example, certain agricultural implements include row units configured to open the soil, dispense seeds into the soil opening, and re-close the soil in a single operation. Such implements are generally coupled to a tow vehicle, such as a tractor, and pulled through a field. In certain configurations, seeds are conveyed to the row units by the illustrated air cart 10, which is generally towed in sequence with the implement. In alternative configurations, the air cart 10 may be configured to provide fertilizer to the row units, or a combination of seeds and fertilizer.

In the illustrated embodiment, the air cart 10 includes a storage tank 12, a frame 14, wheels 16, a metering assembly 18 and an air source 20. In certain configurations, the storage tank 12 includes multiple compartments for storing various flowable particulate materials. For example, one compartment may include seeds, such as canola or mustard, and another compartment may include a dry fertilizer. In such configurations, the air cart 10 is configured to deliver both the seeds and fertilizer to the implement. The frame 14 includes a towing hitch configured to couple to the implement or tow vehicle. As discussed in detail below, seeds and/or fertilizer within the storage tank 12 are gravity fed into the metering assembly 18. The metering assembly 18 includes meter rollers that regulate the flow of material from the storage tank 12 into an air flow provided by the air source 20. The air flow then carries the material to the implement by pneumatic conduits. In this manner, the row units receive a supply of seeds and/or fertilizer for deposition within the soil.

Figure 2:
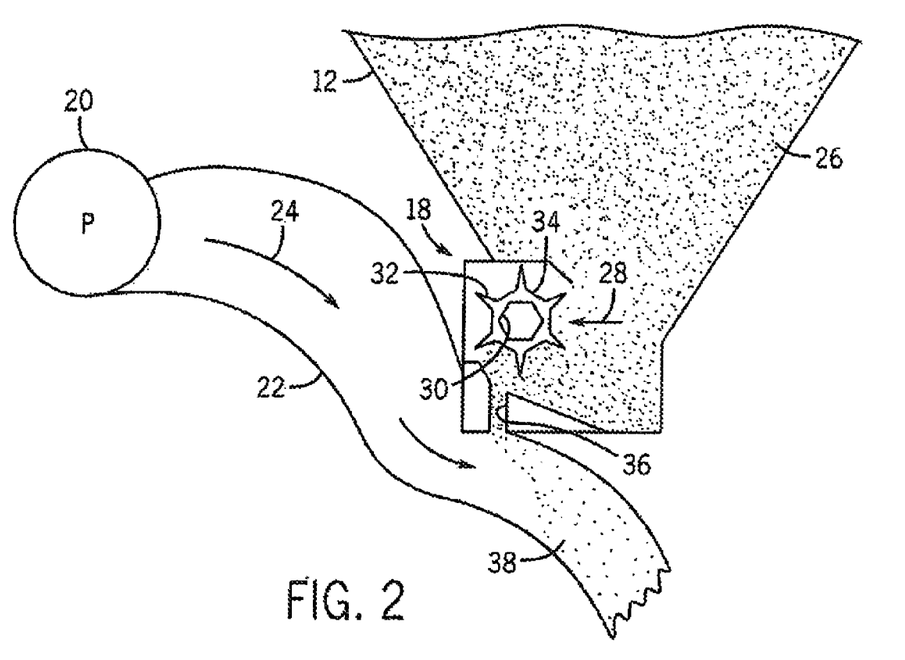
FIG. 2 is a schematic view of the metering assembly, as shown in FIG. 1, including a meter roller.

FIG. 2 is a schematic view of the metering assembly 18, as shown in FIG. 1. As illustrated, the air source 20 is coupled to a conduit 22 configured to flow air 24 past the metering assembly 18. The air source 20 may be a pump or blower powered by an electric or hydraulic motor, for example. Flowable particulate material 26 (e.g., seeds, fertilizer, etc.) within the storage tank 12 flows by gravity into the metering assembly 18. The metering assembly 18 includes one or more meter rollers 28 configured to regulate the flow of material 26 into the air flow 24. More particularly, the metering assembly 18 may include multiple meter rollers 28 disposed adjacent to one another along a longitudinal axis of the rollers 28. For example, certain metering assemblies 18 include seven meter rollers 28. Such assemblies 18 are known as "7-run" metering assemblies. However, alternative embodiments may include more or fewer meter rollers 28, e.g., 5, 6, 7, 8, 9, or more. Further embodiments may include one continuous meter roller 28.

Each meter roller 28 includes an interior cavity 30 configured to receive a shaft that drives the meter roller 28. In the present embodiment, the cavity 30 has a hexagonal cross section. However, alternative embodiments may include various other cavity configurations (e.g., triangular, square, keyed, splined, etc.). The shaft is coupled to a drive unit, such as an electric or hydraulic motor, configured to rotate the meter rollers 28. Alternatively, the meter rollers 28 may be coupled to a wheel 16 by a gear assembly such that rotation of the wheel 16 drives the meter rollers 28 to rotate. Such a configuration will automatically vary the rotation rate of the meter rollers 28 based on the speed of the air cart 10.

Each meter roller 28 also includes multiple flutes 32 and recesses 34. The number and geometry of the flutes 32 are particularly configured to accommodate the material 26 being distributed. The illustrated embodiment includes six flutes 32 and a corresponding number of recesses 34. Alternative embodiments may include more or fewer flutes 32 and/or recesses 34. For example, the meter roller 28 may include 2, 4, 6, 8, 10, 12, 14, 16, 18, 20, or more flutes 32 and/or recesses 34. In addition, the depth of the recesses 34 and/or the height of the flutes 32 are configured to accommodate the material 26 within the storage tank 12. For example, a meter roller 28 having deeper recesses 34 and fewer flutes 32 may be employed for larger seeds, while a meter roller 28 having shallower recesses 34 and more flutes 32 may be employed for smaller seeds. Other parameters such as flute pitch (i.e., rotation relative to a longitudinal axis) and flute angle (i.e., rotation relative to a radial axis) may also be varied in alternative embodiments.

For a particular meter roller configuration, the rotation rate of the meter roller 28 controls the flow of material 26 into the air stream 24. Specifically, as the meter roller 28 rotates, material is transferred through an opening 36 in the metering assembly 18 into the conduit 22. The material then mixes with air from the air source 20, thereby forming an air/material mixture 38. The mixture then flows to the row units of the implement via pneumatic conduits, where the seeds and/or fertilizer are deposited within the soil. As will be appreciated by those skilled in the art, if the flow of material from the meter roller 28 is not continuous, the air/material mixture 38 will not be substantially uniform. Therefore, measurement of material flow rate from the metering assembly 18 will be difficult and/or the row units will not receive a continuous supply of seeds and/or fertilizer, resulting in an uneven distribution through the field. Consequently, the present system and method for measuring meter roller flow rate may be employed to develop meter rollers configured to provide a more even flow of material into the airstream and ultimately to the row units for placement in the soil.

Figure 3:
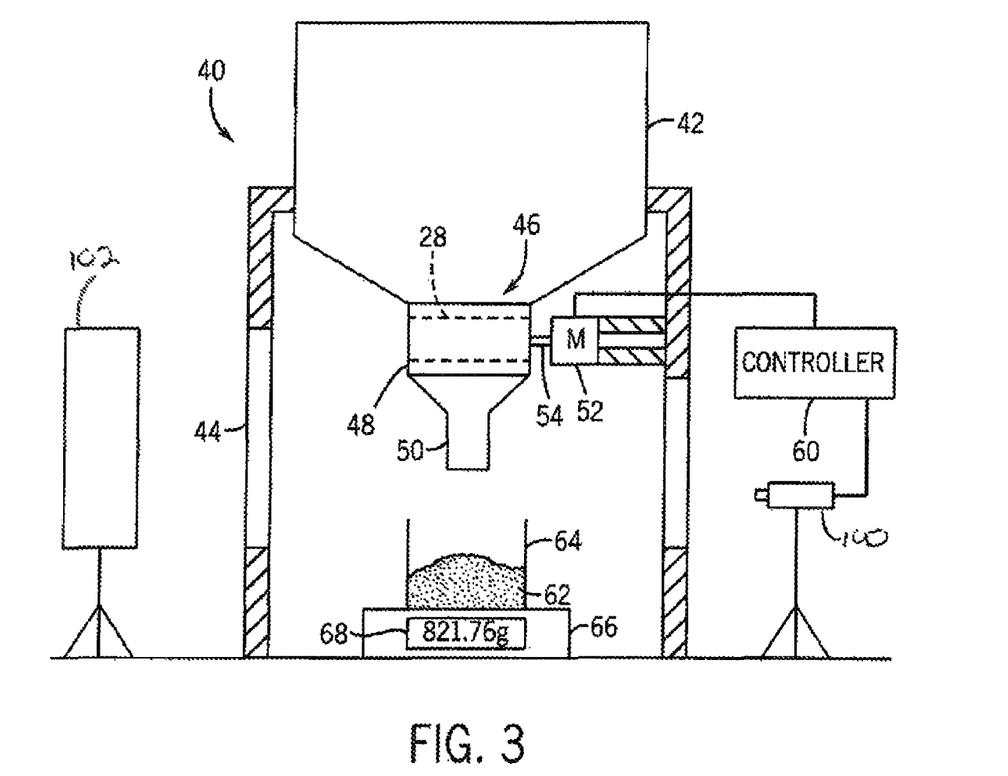
FIG. 3 is a schematic view of a system for measuring flow rate from a meter roller, such as the meter roller shown in FIG. 2.

FIG. 3 is a schematic view of a system 40 for measuring flow rate from a meter roller 28. While a meter roller 28 is employed within the system 40 of the present embodiment, alternative embodiments may employ other metering devices such as augers or rotary valves, for example. In the present embodiment, the system 40 is configured to determine a degree of flow rate discontinuity from a particular meter roller 28 such that improvements may be made to meter roller designs. The illustrated system 40 includes a storage tank 42 suspended above the ground by a framework 44. A metering assembly 46 is disposed below the storage tank 42. Unlike the metering assembly 18 from the air cart 10, the metering assembly 46 contains a single meter roller 28. This configuration facilitates evaluation of individual meter rollers 28 such that meter roller designs may be accurately compared. However, alternative embodiments may employ multiple meter rollers 28 within the metering assembly 46. The meter roller 28 is housed within a meter box 48 connected to a chute 50. As discussed in detail below, the chute 50 is configured to direct a flow of material into a container for measurement.

In the present configuration, the meter roller 28 is driven to rotate by a drive unit 52 coupled to the meter roller 28 by a shaft 54. A variety of drive units 52 may be utilized, such as electric, pneumatic or hydraulic motors. In the present embodiment, an electric control motor is employed to drive the meter roller 28. The motion control motor is configured to rotate the meter roller precisely and accurately, thereby ensuring repeatable results. The drive unit 52 is coupled to a controller 60 configured to instruct the drive unit 52 to rotate the meter roller 28 at a constant speed approximating a real world application speed for the roller 28. For example, the controller 60 may be a computer coupled to the drive unit 52 by I/O cables (e.g., RS-232, USB, etc.), and configured to control the speed of rotation of the meter roller 28. As discussed in detail below, output from the meter roller 28 is measured at a constant speed of rotation of the roller 28 to compute flow rate discontinuity.

Material or product 62, e.g., seeds, fertilizer, etc., is collected within a container 64 positioned below the chute 50. The container 64 is disposed on a measuring device 66 configured to determine a quantity of material 62 output from the meter roller 28. For example, in the present embodiment, the measuring device 66 is a scale or balance configured to determine a weight or mass of the material 62. The measuring device 66 includes a display 68 configured to output a value indicative of the quantity of material 62 within the container 64. For example, the display 68 on the scale of the present embodiment is illustrated as displaying a mass in grams. In certain configurations, the measuring device 66 is communicatively coupled to a computer or other electronic recording device (e.g., the controller 60) configured to automatically store the output from the measuring device 66. In an alternative exemplary embodiment, the device 66 can be disposed over or adjacent a separate collection container (not shown). In this embodiment, after weighing the quantity of material 62 in the device 66, the device 66 can dispense the material 62 into the separate collection container for storage of the material 62 and to ready the device 66 for a subsequent repetition.

The material 62 also passes between a camera 100 positioned to one side of the container 64 and a light source 102 disposed on the other side of the container 64. The camera 100 is a high speed camera capable of capturing images of the individual particles of the material 62 falling out of the chute 50 as backlit by the light source 102.

Figure 4:
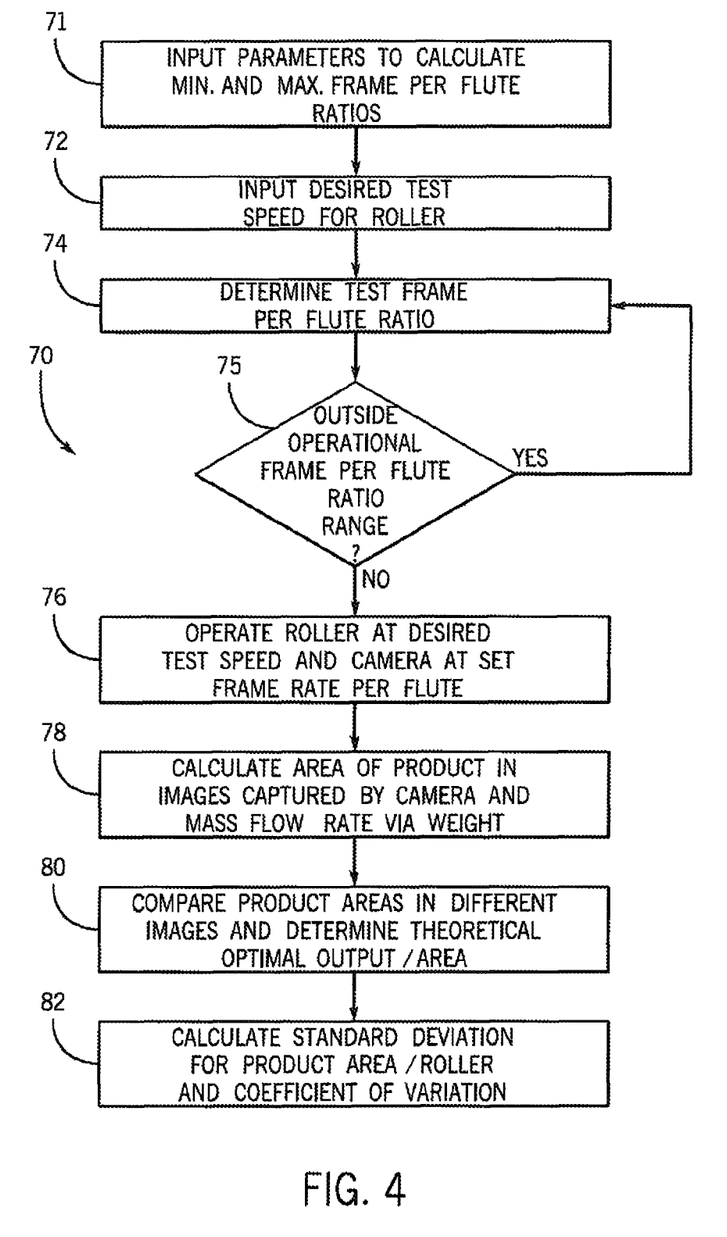
FIG. 4 is a flow chart of a method for determining flow rate discontinuity.

FIG. 4 is a flow chart of a method 70 for measuring flow rate from the meter roller 28 using the system 40. First, as represented by block 71, the minimum, and optionally the maximum, frame-per-flute ratios are determined by inputting certain values regarding the meter roller 28 speed(s) and number of flutes 32, as well as the material 62 to be tested using the system 40 into the controller 60. The minimum frame-per-flute ratio ensures that all material 62 is being imaged at least once and to provide sufficient data to give an accurate representation of the product flow continuity from the roller 28.

Continuity is measured in the test method 70 by comparing the variation in the projected area of the product or output material 62 falling from the metering roller 28 over time. To accomplish this, pictures or frames of the product 62 falling out of the metering device 46 are taken by the high speed camera 100 that capture every particle of product 62 in at least one frame. The product 62 is backlit as it exits the chute 50 because the product 62 is located between the camera 100 and light source 102, which in an exemplary embodiment is a light source having a uniform light distribution from the entire surface of the light source 102. This provides a high contrast image of the product 62 and eliminates hot spots and shadows in the pictures of the product 62.

Many factors must be taken into account during the setup of this test method. In particular, the speed range of the metering roller 28 for the test must be known in order to calculate the flute frequency range of the roller 28. This speed range is usually based on, but not limited to, real world application rates of rotation of the roller 28 during use of the implement 10 including the roller 28. In block 71, with the maximum and minimum operational speeds of rotation of the roller 28 being known and/or input into the controller 60, it can be determined what the flute frequency range is for the roller 28. This done by using the number of flutes 32 present on the roller 28 to determine how many flutes 32 pass a given point in a specified time as a result of the speed of rotation of the roller 28 at the maximum and minimum speeds, or at any intervening speed.

Next, the minimum required frame rate of the camera is determined, based on the height of the frame or picture taken by the camera 100. The frame height or frame of view that the camera 100 is capturing must be held constant for all tests to get consistent results between different meter rollers 28 being evaluated. Knowing the frame height, you can calculate the minimum camera rate to test at in order to capture all of the material 62 at least once. More specifically, ass stated previously, the camera 100 must operate at a fast enough speed to capture an image of every particle of material 62 passing from the chute 50 through the line of sight of the camera 100 at least once. It is important to have a camera that has a large frame rate range in order for the camera 100 to be able to take images at any speed of the roller 28 between the minimum and maximum operational speeds for the roller 28 to be covered in the test method 70.

Once the flute frequency range and the camera frame rate range are known, the frame per flute (fPF) ratio and/or range can be calculated in block 71. Depending on the type of material 62 being metered and the rollers 28 being used, there will be a minimum fPF ratio and maximum fPF ratio to define the range for testing the meter roller 28. With this range being determined, an fPF ratio within this range can be selected for testing, such as by inputting a desired speed for the roller 28 that is used by the controller 60 to determine the associated fPF at that speed, and the meter roller 28 can be tested for a material 62 at the selected fPF ratio. The calculation for the minimum and maximum fPF ratios is as follows.

Minimum Frame-per-flute (fPF) ratio: knowing 1.) the minimum frame rate of the camera 100; 2.) the number of flutes 32 on the meter roller 28; and 3.) the slowest operating meter speed of the meter roller 28, the minimum fPF ratio is calculated as:

fPF min=[(Camera Frame Rate min*60]/[RPM min*#of Flutes]

Maximum Frame-per-flute (fPF) ratio: knowing 1.) the maximum frame rate of the camera, 2.) the number of flutes 32 on the meter roller 28; and 3.) the fastest operating meter speed of the meter roller 28, the maximum fPF ratio is calculated as:

fPF max=[(Camera Frame Rate max*60]/[RPM max*#of Flutes]

The camera 100 must operate at or above the minimum frame per flute ratio, which represents where the standard deviation of product flow starts to fluctuate, as not enough frames are taken of each flute 32, resulting in some particles of the material 62 being missed. Above this minimum frame per flute ratio the standard deviation is relatively constant, which is desired. In one exemplary embodiment, a minimum ratio of 6 frames-per-flute is the lowest the system 40 can operate at without missing material 62 in the frames being taken by the camera 100 and thereby causing significant fluctuations in the standard deviation below that ratio. So, as a check on the minimum operating characteristics for the system 40, the determination of the minimum fPF ratio for a particular meter roller 28 can be done to ensure the area per image is not fluctuating at the minimum fFP ratio, which is recommended if the calculated fPF ratio falls between 6 and 16 frames-per-flute.

However, if the frame per flute ratio is too high, there will be too much material 62 overlap between the individual frame take by the camera 100. In particular, if the product or material 62 mass flow rate becomes too high off of the roller 28, the overlap of the material 62, also known as occlusion, will become high enough that individual particles would not be distinguished in the images taken by the camera 100. Nevertheless, a high frame-per-flute ratio at a low mass flow rate would be acceptable, as it is the overly high mass flow rate that would limit the effectiveness of the system 40 and method 70.

This mass flow rate is dependent on the roller dimension and speed. And can be calculated at the point where mass flow rate and product/material 62 area per image stopped increasing linearly. For instance, past this point the mass flow rate would continue to increase, but the product/material 62 area per image will level off because the camera 100 can no longer distinguish individual particles. It is important to note that each meter roller has a point where the throughput will stop increasing linearly with respect to roller speed. At this point the throughput increase rate will level off because product cannot fill the flutes quick enough. So a larger the flute size means that this point would occur at a lower roller speed. Therefore, it is possible to never hit a point of occlusion (too much product overlap) with certain meter roller designs depending on the geometries of the flute and overall shape.

Once the ratio(s) is determined in bock 71, the user can input the desired speed for the roller 28 for the test in block 72, which is used by the controller 60 in block 74 to determine if the desired speed falls within the minimum and maximum ratios for the operation of the system 40 with that roller 28. If the ratio for the selected speed falls within the operation ratio range, the system 40 can proceed to block 76 where the roller 28 and camera 100 can be operated by the controller 60 as defined by the ratio to capture the images of the product 62 dispensed from the roller 28 at or above the minimum frame to flute ratio. However, if the ratio falls outside of the operational ratio range, the system 40 proceeds back to block 72 to enable the user to re-enter the desired speed for the roller 28.

In block 76, once these parameters are determined, the system 40 is operated at the calculated parameters to feed material 62 into the meter roller 28. In the system 40 of FIG. 3, the material is fed by gravity from the storage tank 42 to the metering assembly 46 housing the meter roller 28 which is rotated at a constant speed. In the exemplary embodiment, the controller 60 operates the drive unit 52 such that the meter roller 28 rotates at the desired speed.

In block 76, as the system 40 is operated, output material 62 dispensed from the meter roller 28 is collected and measured. In the present embodiment, material from the meter roller 28 passes through the chute 50 and collects in the container 64. The material 62 is then measured by the scale 66, and the mass is either manually or automatically recorded at specified intervals to establish an average flow rate using the mass of the product 62.

Simultaneously, the camera 100 is operated to take image of the product/material 62 exiting the chute 50 and prior to reaching the container 64. The images are recorded and stored in the controller 60 and/or in a suitable computing device operably connected to the controller 60. After calculating the output for the operation of the roller 28 at a selected speed in images taken over a given period of time in block 78 and comparing the outputs of different frame to one another in block 80, the statistical parameter indicative of flow rate discontinuity, i.e., the standard deviation (or coefficient of variation), is determined by the controller/computing device 60 based on those measurements, as represented by block 82. In this process, the area of the product 62 is calculated for each individual frame or picture in any known and suitable manner, where the total area of each frame is known from the aperture settings and placement of the camera 100 relative to the product 62. Once the data are collected, they are analyzed by a program in the controller/computing device 60 that calculates and compares the area of product 62 in each frame, such as by comparing the area of the product 62 in one frame to the area of the product/material 62 determined to be present in all other frames taken during that test. If the product flow from the roller 28 is continuous, then the calculated areas of product flow in each frame should be equal. The average of these calculated areas for all of the images can also be utilized to determine a standard deviation of the areas of each individual image from the calculated average area. The measured values for the area of product 62 found in each frame are then compared to the theoretical optimal output to compute a standard deviation from the theoretical output in a known manner, the standard deviation representing a parameter indicative of flow rate discontinuity. In an exemplary embodiment, the theoretical optimal output is achieved when the area of product per frame would be equal in each frame. In addition, this theoretical optimal output can be determined from the average area of product per frame, then the actual data could be compared to the theoretical optimal output.

The standard deviation is a measure of the degree of deviation of the data points from the average. The higher the standard deviation, the greater the divergence of points from the average. The lower the standard deviation, the smaller the divergence of points from the average. Therefore, standard deviation is an effective representation of the magnitude of flow discontinuity from a meter roller 28. A high standard deviation of the area of product 62 shown in the frames indicates that the flow varies significantly, while a low standard deviation of the area of product 62 shown in the frames indicates that the flow rate is substantially continuous. The standard deviation can then be used to calculate the coefficient of variation for the particular product 62 dispensed from the roller 28, also in a known manner, which represents how far off the meter roller 28 was from the theoretical value of perfectly continuous product flow at the particular speed of rotation. This coefficient of variation (CV) is the quantity used to identify the value flow evenness (continuity) off the meter roller. The lower the CV (closest to 0), the better the flow continuity is because the closer the actual flow continuity is to the theoretical optimal flow evenness.

Therefore, flow rate discontinuity between meter rollers 28 may be directly compared based on the standard deviation computed using the method 70. Consequently, a meter roller 28 may be designed to provide enhanced flow properties (i.e., lower standard deviation) for a particular seed or fertilizer. Therefore, output from the meter roller may be better controlled during operation of the air cart, air seeder, planter, etc., to enhance distribution of seeds and/or fertilizer within the soil. Further, as a result of the method 70 being based on the operational speeds of the roller 28 and the number of flutes 32 present on the roller 28, this method 70 can be used for evaluation of the continuity of any type of product 62 and/or any type of roller 28 in combination with one another.

The process of the method 70 is computer controlled using the controller 60. The operator only has to input parameters (i.e. number of flutes 32 per roller 28, the operation speed of the roller 28 and the type of product 62)

into the controller 60 in block 72 using a suitable input device, such as a keyboard (not shown) operably connected to the controller 60 in order for the controller 60 to calculate the operating conditions for the test method 70 and conduct the test. As a result, some of the advantages with this method 70 include a faster and more efficient testing method than the discrete test method, and representation of real world application rates in the results of the method 70.

A possible alternative embodiment of the method 70 in conjunction with or separately from the camera 100 is to use the container 64 and scale 66 to continuously measure the mass of the product 62 coming out of the meter roller 28, and determine if the total mass of the material/product 62 is increasing at a continuous rate or pulsing over time. In addition, other arrangements for the light source 102 and camera 100 could be developed, or other statistics and/or algorithms can be employed by the controller 60 used to assess the continuity of the flow of product 62 from the roller 28.

In still another alternative embodiment, the system 40 can be mounted on an air cart 10 in field operation such that the system 40 and method 70 can be used during the calibration process of the air cart 10 before and during field operation Many changes and will modifications could be made to the invention without departing from the spirit thereof. The scope of these changes will become apparent from the appended claims.

We claim:

1. A method for measuring a flow rate from a metering device, comprising:
   feeding a flowable particulate material into the metering device;
   rotating a meter roller of the metering device at a predetermined speed such that the flowable particulate material is dispensed from the metering device along a path, the meter roller having an operating meter speed and a number of flutes circumferentially spaced thereabout;
   positioning a camera on a first side of the path, the camera having a minimum frame rate, a maximum frame rate and a lens directed at the flowable particulate material dispensed from the metering device;
   calculating a minimum frame-per-flute ratio in response to the minimum frame rate of the camera, a number of flutes about the meter roller and a minimum operating meter speed of the meter roller;
   calculating a maximum frame-per-flute ratio in response to the maximum frame rate of the camera, the number of flutes about on the meter roller and a maximum operating meter speed of the meter roller;
   operating the camera at a frame rate greater than or equal to the minimum frame per flute ratio and less than or equal to the maximum frame-per-flute ratio so as to take a series of images of the flowable particulate material dispensed from the metering device with the camera such that each particle of material of the flowable particulate material dispensed from the metering device and passing through a line of sight of the lens is captured in at least one image of the series of images;
   backlighting the path of the flowable particulate material dispensed from the metering device to enhance the series of images taken;
   measuring a parameter of the flowable particulate material for each image;
   comparing the measurement of the parameter of the flowable particulate material for each image with the measurement of the parameter of the flowable material in all images to determine a statistical parameter indicative of flow rate discontinuity; and
   using a scale to continuously measure a mass of the flowable particulate material dispensed from the metering device.

2. The method of claim 1, wherein each measuring step comprises determining an area of the output flowable particulate material in each image.

3. The method of claim 2, wherein comparing the measurement for each image with the measurement for the area comprises dividing the measurement for the area of the flowable particulate material in all images by number of images to determine an average.

4. The method of claim 1, wherein the statistical parameter indicative of flow rate discontinuity is a standard deviation between the measurement for each image and the average.

5. A method for measuring a flow rate from a metering device by rotating a meter roller of the metering device at an operational speed for a specified period of time, the meter roller having a number of flutes circumferentially spaced thereabout, the method characterized by:
   dispensing flowable particulate material from the metering device along a path;
   positioning a camera on a first side of the path, the camera having a minimum frame rate, a maximum frame rate and a lens directed at the flowable particulate material dispensed from the metering device;
   calculating a minimum frame-per-flute ratio in response to the minimum frame rate of the camera, a number of flutes about the meter roller and a minimum operational speed of the meter roller;
   calculating a maximum frame-per-flute ratio in response to the maximum frame rate of the camera, the number of flutes about on the meter roller and a maximum operational speed of the meter roller;
   operating the camera at a frame rate greater than or equal to the minimum frame per flute ratio and less than or equal to the maximum frame-per-flute ratio so as to take a series of images of the flowable particulate material dispensed from the metering device with the camera such that each particle of material of the flowable particulate material dispensed from the metering device and passing through a line of sight of the lens is captured in at least one image of the series of images;
   measuring output from the meter roller from the image taken of the output;
   comparing the measurement to a theoretical value equal to a total area of the output from the meter roller for all images of the output of the meter roller divided by the total number of images; and
   using a scale to continuously measure a mass of the output dispensed from the metering device.

6. The method of claim 5, wherein measuring output from the meter roller from the image of the output comprises determining an area of the output in the image of the output.

7. The method of claim 5, comprising measuring output from the meter roller for each image.

8. The method of claim 5, comprising comparing the measurement for each image to the theoretical value to determine a statistical parameter indicative of flow rate discontinuity.

9. The method of claim 8, wherein the statistical parameter indicative of flow rate discontinuity is a standard deviation between the measurement for each increment and the theoretical value.

10. An apparatus for measuring a flow rate from a meter roller, comprising:
- a metering assembly configured to receive a flowable particulate material;
- a meter roller disposed within the metering assembly, the meter roller having a number of flutes circumferentially spaced thereabout;
- a drive unit coupled to the meter roller and configured to rotate the meter roller within the metering assembly, the meter roller having a minimum and a maximum operating speed;
- a drive unit controller communicatively coupled to the drive unit and configured to instruct the drive unit to rotate the meter roller at a specified speed to output the flowable particulate material from the metering assembly;
- a measuring device configured to take a series of images of the flowable particulate material output from the metering assembly, the measuring device having a minimum and a maximum frame rate;
- a controller operatively connected to the measuring device and being configured to:
  - calculate a minimum frame-per-flute ratio in response to the minimum frame rate of the measuring device, the number of flutes about the meter roller and the minimum operating speed of the meter roller;
  - calculating a maximum frame-per-flute ratio in response to the maximum frame rate of the measuring device, the number of flutes about on the meter roller and a maximum operating seed of the meter roller; and
  - cause the measuring device to take a series of images of the flowable particulate material dispensed from the metering device camera at a frame rate greater than or equal to the minimum frame per flute ratio and less than or equal to the maximum frame-per-flute ratio such that each particle of the flowable particulate material outputted by the metering assembly and passing through a line of sight of the measuring device is captured in at least one image; and
- a scale configured to continuously measure a mass of the flowable particulate material dispensed from the metering device.

11. The apparatus of claim 10, wherein the measuring device includes a camera configured to take images of the flowable particulate material output of the metering assembly.

12. The apparatus of claim 11, further comprising a light source disposed opposite the camera.

* * * * *